ical way of making the product, but
UNITED STATES PATENT OFFICE.

ALFRED HUGH GALLAGHER, OF CHICAGO, ILLINOIS, ASSIGNOR TO TANNERS PRODUCTS COMPANY, OF CHICAGO, ILLINOIS, A CORPORATION OF DELAWARE.

BAT FOR UPHOLSTERY.

1,368,921.   Specification of Letters Patent.   Patented Feb. 15, 1921.

No Drawing.   Application filed May 7, 1919.   Serial No. 295,512.

*To all whom it may concern:*

Be it known that I, ALFRED H. GALLAGHER, a citizen of the United States, residing at Chicago, in the county of Cook and State of Illinois, have invented certain new and useful Improvements in Bats for Upholstery; and I do declare the following to be a full, clear, and exact description of the invention, such as will enable others skilled in the art to which it appertains to make and use the same.

In the manufacture and use of cotton bats for upholstery, and for pads, mattresses and the like, a familiar difficulty is the tendency of the cotton to pack and to become hard. This tendency is less where the better grades of cotton are used, but the expense of such grades is such as to generally prevent their employment in this class of goods. My invention is designed to provide a product of the character indicated which will not pack or become hard, and which, at a cost less than the cost of the higher grades of cotton, shall insure, for the purposes referred to, a material superior to the best and most expensive grades of cotton.

In accordance with my invention, I thoroughly mix with the cotton a quantity of fibers of a stiffer and more springy nature, such as cattle hair. The cattle hair serves to keep the bat in a loose and soft condition and does not allow it to become compact and hard in use.

I do not wish to confine myself to any particular way of making the product, but preferably the hair is first cleaned and then thoroughly mixed with the cotton. Good results have been obtained by using the cotton and hair in about equal proportions. The mixture is next formed into thin sheets by means of suitable carding machinery. The sheets thus formed are superposed to form bats of the required thickness. The resulting product is soft and fluffy and will not become compact and hard in use, in spite of the fact that the cotton employed may be of a cheaper grade.

What I claim is:—

1. A bat or the like comprising a plurality of superposed layers composed of a mixture of cotton and animal hairs, the animal hairs being of a stiffer and more springy character than the cotton to maintain the bat in a loose condition and prevent consolidation or compacting thereof in use.

2. A bat or the like comprising a plurality of superposed layers composed of a mixture of substantially equal portions of cotton and animal hairs, the animal hairs being of a stiffer and more springy character than the cotton to maintain the bat in a loose condition and prevent consolidation or compacting thereof in use.

In testimony whereof I affix my signature in presence of two witnesses.

ALFRED HUGH GALLAGHER.

Witnesses:
　LEO M. FOX,
　MAUDE L. MARKS.